W. P. PICKARD.
VEHICLE-BRAKE.

No. 192,932. Patented July 10, 1877.

WITNESSES:
A. W. Almquist
Alex T. Roberts

INVENTOR:
Wm. P. Pickard
BY
ATTORNEYS.

UNITED STATES PATENT OFFICE.

WILLIAM P. PICKARD, OF COLUMBIA, TENNESSEE.

IMPROVEMENT IN VEHICLE-BRAKES.

Specification forming part of Letters Patent No. 192,932, dated July 10, 1877; application filed December 4, 1876.

*To all whom it may concern:*

Figure 1:
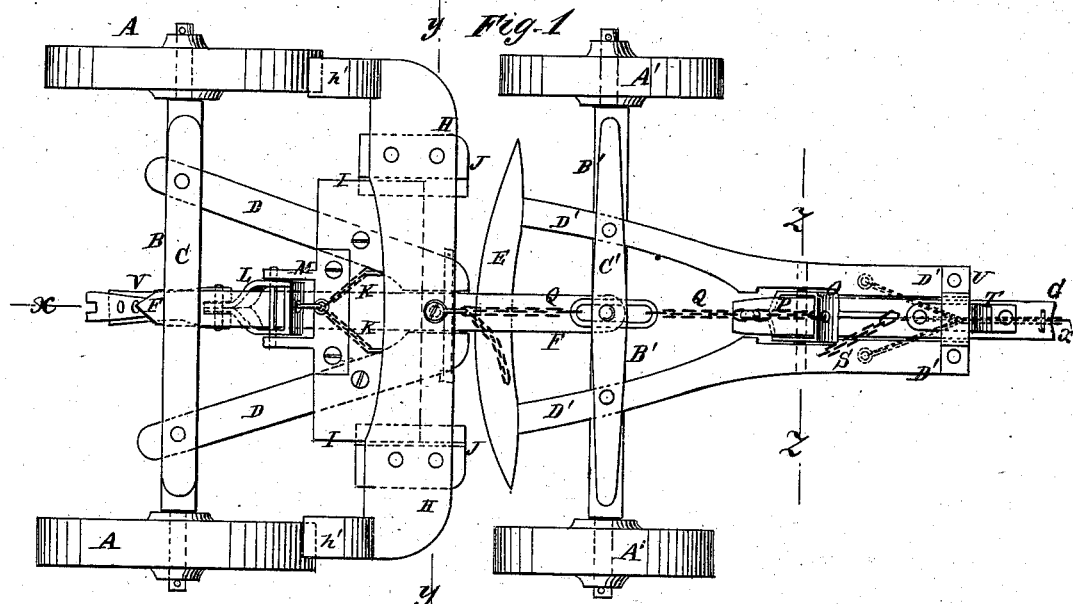
Figure 2:
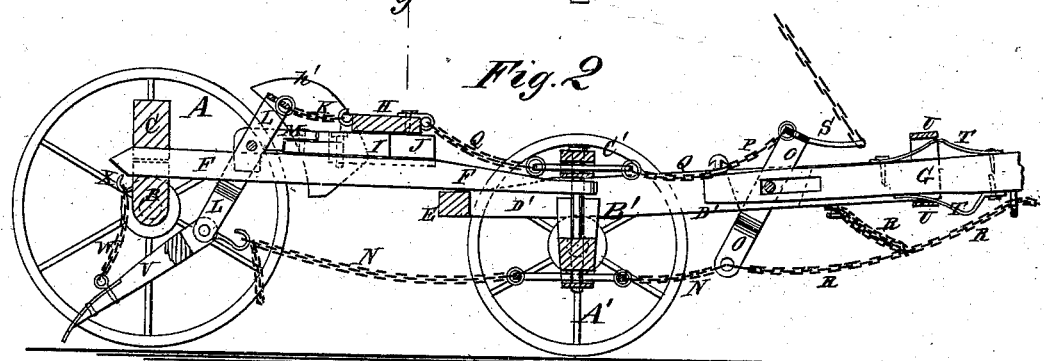
Figure 3:
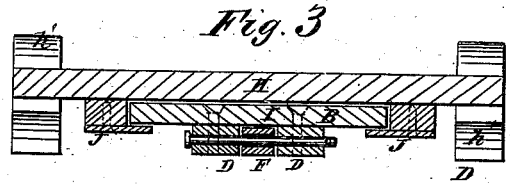
Figure 4:
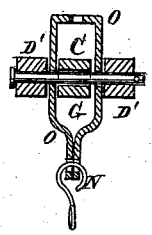

Be it known that I, WILLIAM PAISLEY PICKARD, of Columbia, in the county of Lawrence and State of Tennessee, have invented a new and useful Improvement in Brakes, of which the following is a specification:

In the accompanying drawing, Figure 1 is a top view of the running-gearing of a wagon. Fig. 2 is a vertical longitudinal section of the same, taken through the line X X, Fig. 1. Fig. 3 is a detail cross-section, taken through the line Y Y, Fig. 1; and Fig. 4 is a detail cross-section of the same, taken through the line Z Z, Fig. 1.

Similar letters of reference indicate corresponding parts.

The object of this invention is to furnish an improved brake for wagons, drays, carts, and other vehicles, which shall be so constructed that the forward pressure of the vehicle against the horses may apply the brake, which will enable the draft of the forward horses of a four-horse team to assist in applying the brake, and which will enable the brake to be applied by hand, when desired.

The invention consists in the construction and arrangement of parts, which will be hereinafter more fully described, and then pointed out in the claims.

In the drawing, A represents the rear wheels, and A' the forward wheels. B is the rear axle, and B' is the forward axle. C is the rear bolster, and C' is the forward bolster. D represents the rear hounds, and D' the forward hounds. E is the sway-bar. F is the reach, and G is the tongue. H is the brake-bar, to the ends of which are attached the brake-shoes *h'*. The brake-bar H rests and slides upon a plate, I, attached to the rear hounds D, and is kept in place upon said plate I by the blocks and plates J, attached to the said brake-bar H in such a way that the said blocks may rest against and the said plates underlap the ends of the said plate I. To the rear side of the brake-bar H are attached the ends of two short chains, K, the other ends of which are attached to the upper end of the lever L. The lever L is pivoted to the reach F, or to a bracket, M, attached to the plate I, or to the rear hounds D, as may be convenient. The lever L is slotted longitudinally to receive the reach F, and to its lower end is attached the rear end of the chain N. The chain N has a long link formed in it, which passes through and works in a recess between the forward axle B' and a plate attached to the lower side of said axle, and through which the king-bolt passes. The forward end of the chain N is attached to the lower end of the lever O, which is slotted to receive the rear part of the tongue G, is placed in recesses in the inner sides of the forward hounds D', and is pivoted to the bolt that connects the tongue G with the hounds D'. The rear part of the tongue G is slotted longitudinally to receive the bolt that connects it with the hounds D' to allow it to have a short longitudinal movement. To the upper end of the lever O is attached the end of the short chain P, the other end of which is attached to the rear end of the tongue G, so that the rearward movement of the tongue as the horses hold back may apply the brake. To the rear end of the tongue G is attached the forward end of the chain Q, which has a long link formed in it to pass through a recess between the forward bolster C' and a plate attached to the lower side of said bolster, to receive the king-bolt. The rear end of the chain Q is attached to the center of the brake-bar H, so that the brake may be withdrawn from the wheels by the forward movement of the tongue G. R is a chain, the rear end of which is supported from the forward hounds, and which passes through keepers attached to the under side of the tongue G, and has its forward end attached to the double-tree of the forward team, this double-tree being of an ordinary construction and arranged in the usual manner.

With this construction, when about to descend a steep hill, if the forward horses are unruly the chain R is drawn back and hooked upon the lower end of the lever O, so that if the forward horses should spring forward, or attempt to draw, they will only apply the brake more firmly. The chain R may be also used when the team is to be left standing, so that should the horses start forward they may apply the brake and stop themselves. To the upper end of the lever O, or to an arm attached to said lever, is attached the end of a chain or strap, S, which extends up into such a position that the driver can reach and operate it to apply the brake to hold the wagon, in going uphill, when the team is stopped to rest. The chain or strap S, when holding the brake applied, may be hooked upon a hook attached to some convenient part of the wagon-body. The chain or strap S may also be used to apply the brake when the team are to be left standing. T represents thin plates of iron or steel, the middle parts of which are curved outwardly, or made with a double incline, and which are secured to the upper and lower sides of the tongue G, at the forward ends of the hounds D′, to check the wagon from the hind horses when descending a steep hill, or passing over a rough road. The slip-checks T bear against narrow cross-plates U of iron attached to the upper and lower sides of the forward ends of the hounds D′. The slip-checks are applied to the draft-pole in such a manner that they will serve to retain the same in position while drawn forward or pushed backward, this being effected by the pressure of the bulging portion of the slip-checks on the cross-plates U.

To the lower end of the rear-lever L is pivoted a swinging bar, V, the lower end of which rests upon the ground, and is shod with iron to hold the wagon from running back when the team is stopped to rest in going uphill. To the lower part of the bar V is attached a chain, W, which may be hooked upon a hook, X, attached to the rear axle B, to support the said bar V, when not required for use.

I do not claim, broadly, a system of levers and chains in connection with a draft-pole, and brake devices for applying the latter in an automatic manner by the team when descending steep grades, this idea being well known.

Having thus described my invention, I claim as new and desire to secure by Letters Patent—

1. The combination of the sliding tongue G, vertical levers L O, pivoted at or near their centers, the chain K, sliding brake-beam H, chains Q, N, and P, with the wagon gearing or body, as and for the purpose set forth.

2. The combination of the movable tongue G, having the curved plates or slip-checks T, with the front hounds D′ provided with the cross-plates U, as and for the purpose set forth.

3. The auxiliary brake-chain R, in combination with the draft-pole, front double-tree, and brake devices, as and for the purpose set forth.

4. The hinged or movable drag-bar V, and the suspension-chain W, in combination with the pivoted lever L, and rear axle B, as and for the purpose set forth.

WM. PAISLEY PICKARD.

Witnesses:
   J. W. VANCE,
   S. W. SMITH.